United States Patent [19]
Bruesselbach et al.

[11] Patent Number: 4,968,121
[45] Date of Patent: Nov. 6, 1990

[54] HERMETICALLY SEALED APPARATUS AND METHOD FOR MAINTAINING CRYSTALS AT A CONTROLLED OPERATING TEMPERATURE

[75] Inventors: Hans W. Bruesselbach, Calabasas; Robert H. Sipman, Agoura, both of Calif.

[73] Assignee: Hughes Aircraft Company, Los Angeles, Calif.

[21] Appl. No.: 281,134

[22] Filed: Dec. 7, 1988

[51] Int. Cl.$^5$ ............ G02B 5/23; H03F 7/00; F27D 7/04
[52] U.S. Cl. ................... 350/354; 307/425; 432/199; 432/200
[58] Field of Search ............ 350/354; 372/21, 22; 307/424, 425, 426, 427, 428, 429, 430; 432/120, 199, 200

[56] References Cited

U.S. PATENT DOCUMENTS

| | | | |
|---|---|---|---|
| 3,789,235 | 1/1974 | Bridges et al. | 307/425 |
| 3,795,819 | 3/1974 | Harris | 307/425 |
| 3,858,056 | 12/1974 | Melamed et al. | 307/425 |
| 4,019,159 | 4/1977 | Hon et al. | 332/7.51 |
| 4,181,899 | 1/1980 | Liu | 331/94.5 |

OTHER PUBLICATIONS

Y. S. Liu et al., "Specific Heat of Cesium Dideuterium Arsenate (CsD$_2$AsO$_4$) from 0° to 120° C., Applied Physics Letters", vol. 27, No. 11, 12/01/75, pp. 585–587.
D. T. Hon, "Electrooptical Compensation for Self-Heating in CD*A During Second-Harmonic Generation", IEEE Journal of Quantum Electronics, vol. QE 12, No. 2, Feb. 1976, pp. 148–151.
T. Sato, "Laser Heating Effect on Second Harmonic Generation in CDA and CD*A", Journal of Applied Physics, vol. 48, No. 7, Jul. 1977, pp. 3120–3121.

*Primary Examiner*—Eugene R. LaRoche
*Assistant Examiner*—Michael B. Shingleton
*Attorney, Agent, or Firm*—V. D. Duraiswamy; P. M. Coble; W. K. Denson-Low

[57] ABSTRACT

An apparatus for maintaining a crystal at a precisely controlled operating temperature over extended periods of time without significant thermal degradation of the crystal. The apparatus has thermally conducting walls. The walls define an inner hermetically sealed chamber for the crystal. Input and output windows are hermetically sealed to the input and output ends of the chamber. The inner surfaces of these windows are maintained at the operating temperature of the crystal to prevent fogging of the windows. Flexible thermal conducting layers are used between the crystal surfaces and the walls of the chamber to achieve uniform and continuous thermal contact therebetween, without mechanical stress to the crystal. The structure provides fast thermal response, controlled temperature in the crystal interaction region and stability of operation over extended periods of time. In one preferred embodiment, the crystal is held in suspended position within the chamber between a pair of spring-loaded plungers. Other embodiments and options are also disclosed.

19 Claims, 2 Drawing Sheets

HERMETICALLY SEALED APPARATUS AND METHOD FOR MAINTAINING CRYSTALS AT A CONTROLLED OPERATING TEMPERATURE

BACKGROUND OF THE INVENTION

1. Field of the Invention

This invention generally relates to nonlinear optics applications. More particularly, this invention relates to ovens for maintaining crystals at a desired operating temperature for optics applications.

2. Description of the Related Art

There are many nonlinear optics applications which require heating a crystal to a specific operating temperature and maintaining the heated crystal at that specific operating temperature or at a programmed sequence of predetermined temperatures over a long period of time. Frequency doubling arrangements, for example, require critical temperature control. This is discussed in U.S. Pat. No. 4,019,159, "Optical Frequency Doubler Using Electro-Optic Crystal with Improved Feedback Control of Crystal Phase Match", issued Apr. 19, 1977, and assigned to Hughes Aircraft Company, the assignee of the present invention.

Optical frequency doubling can be achieved by passing a laser beam through a crystal of a material which develops laser beam components at harmonic frequencies of the frequency of the input beam. Maximum conversion of energy to the double frequency (second harmonic) beam occurs when light propagates through the crystal with a phase velocity at the fundamental frequency equal to the phase velocity at the second harmonic frequency. This phase-match condition is achieved when the crystal has an index of refraction for light at the fundamental frequency equal to the index of refraction for light at the second harmonic frequency.

Two key parameters affect the indices of refraction of these crystals and hence the frequency doubling efficiency: firstly, the physical alignment of the crystal with respect to the incoming radiation and secondly, the temperature of the crystal. A slight change in either one of these parameters can reduce the amplitude of the doubled frequency output considerably. Maintaining the crystal in the proper alignment is relatively straightforward as long as the alignment tolerance angle is not too small. However, maintaining the temperature of the crystal at the critical value for which the desired phase match occurs has been problematic.

One of the most widely used nonlinear crystals for frequency doubling applications is Potassium Dihydrogen Phosphate (KD*P), however, the nonlinear crystal Cesium Dideuterium Arsenate (CD*A) is actually more desirable for frequency doubling applications. CD*A has the property of 90° phase matching for doubling of 1.06 $\mu$m lasers. The angular tolerance for the beam divergence for CD*A is about 50 times larger than that for KD*P, and therefore, CD*A accepts beams with relatively larger angular spread than KD*P. CD*A does not alter the beam polarization, and can be readily used in phase conjugated oscillator/amplifiers. CD*A has a much higher damage threshold than Lithium Niobate and Barium Sodium Niobate which also allow 90° phase matching for 1.06 $\mu$m lasers. Therefore, CD*A is more attractive for medium energy and power frequency doubling applications than the more widely used KD*P. In spite of the potential advantages and superior performance of CD*A, however, CD*A crystals have not been widely used because of numerous problems associated therewith.

The phase match temperature for CD*A is approximately 110° C. In the past, when CD*A was operated at 110° C. for extended periods of time, degradation of the crystal surfaces occurred, eventually resulting in device breakdown. Additionally, the phase match temperature and deuteration level of CD*A were found to fluctuate considerably.

Ovens have been employed to heat the crystal to the desired phase-match temperature. As the laser beam traverses a crystal, however, sufficient absorption-induced heating of the crystal occurs to destroy the phase-match condition that has been created. Although the oven temperature can be controlled in response to a measured temperature, the thermal time constants inherent in direct oven temperature control servos are too slow to be practical. Therefore, a common practice in the industry has been to preset the oven temperature a few degrees below the desired phase-match temperature and allow the crystal heating due to interaction with the laser beam to raise the crystal temperature to substantially the phase-match temperature. Such preset oven temperature arrangements, however, require substantial start-up times before the crystal reaches the desired operating temperature, and in addition, they do not provide continuous control over the double frequency output amplitude. Therefore, although this approach has attempted to solve the problem of absorption-induced heating, it has not addressed the other problems of using CD*A crystal.

One approach to compensating for the deleterious optical effects of crystal self-heating in nonlinear crystals, such as cesium dideuterium arsenate (CD*A), is disclosed in U.S. Pat. No. 4,181,899, "High Power Optical Second Harmonic Generation in NonLinear Crystals", inventor Y. S. Liu, issued Jan. 1, 1980. The Liu approach involves tuning the laser output frequency in accordance with sensed crystal temperature, to compensate for the phase mismatch caused by crystal self-heating when the laser radiation is incident on the crystal. However, this approach is not satisfactory in cases where fixed output frequencies are required.

Another approach disclosed in U.S. Pat. No. 4,019,159, provides a feedback control arrangement responsive to both the magnitude of the double frequency component and to the temperature within the oven. The indices of refraction of light in the frequency doubling electro-optic crystal are controlled by both electric field pulses applied across the crystal and heater control pulses for controlling the temperature of the oven in which the crystal is mounted. This approach provides much faster temporal response than the previously discussed approach.

Although both of these approaches may be used in the oven of the present invention, neither approach by itself satisfactorily provides for rapid and controlled heat dissipation, and rapid sensing and control of the crystal temperature.

It has been previously noticed that heating the CD*A crystal in a sealed cell over a period of time result in the deposition of a thin liquid film on the inside surface of the cell windows which were cooler than the crystal. This condensation caused laser damage to the windows and eventually the crystal. One prior approach to solving this problem was to continuously purge the oven chamber with dry nitrogen to prevent condensation on the windows. This approach, however, actually accelerated crystal degradation. Another approach was to use an open cell so that the vapor could leave the cell. This approach, however, made it difficult to uniformly heat the crystal and maintain the entire heated crystal at the desired operating temperature over a period of time.

Highly deuterated CD*A has been recognized to be highly desirable for frequency doubling applications due to significant reduction in absorption. However, thermal degradation of the highly deuterated CD*A has continued to be a problem. See Y. S. Liu et al., "Specific Heat of Cesium Dideuterium Arsenate ($CSD_2AsO_4$) from 0° to 120° C.", Appl. Phys. Lett., Vol. 27, No. 11, pp. 585–587. Prior proposed solutions to this problem have had other undesirable side effects or drawbacks. For example, it has been suggested that a less highly deuterated material may be used. Such a material has a comparatively lower phase-match temperature, and therefore thermal degradation induced by heating a more highly deuterated crystal to a higher phase-match temperatures can be avoided. Unfortunately, however, less highly deuterated CD*A has more absorption, and this offsets the previously stated advantage.

Another approach is the use of highly deuterated, low absorption CD*A with angle phase matching. Highly deuterated CD*A operates noncritically phase matched at 110° C. or higher, but can be angle tuned at lower temperatures, for example 80°–90°, depending on the deuteration level. However, operation at lower temperatures offsets some of the advantages of CD*A over KD*P, such as wide acceptance angle and absence of walk-off.

The previous approaches to modifying the crystal-heating ovens to solve the above-discussed problems associated with the use of CD*A have not been entirely satisfactory. Therefore, there continues to be a need for an apparatus capable of uniformly heating a crystal or maintaining the heated crystal at a specific operating temperature for extended periods of time.

SUMMARY OF THE INVENTION

The present invention provides an apparatus for uniformly heating a crystal and maintaining the heated crystal at a controlled operating temperature, over extended periods of time without significant thermal degradation of the crystal. The apparatus comprises an oven having walls formed of a thermally conductive material and an inner chamber within the oven, the chamber being defined by the walls and having at least one input window and one output window positioned respectively at each end of the chamber. The inner surfaces of the input and output windows are maintained at the operating temperature of the crystal to prevent condensation on the windows. The windows are sealed to the input and output ends of the chamber, respectively, with hermetic seals. The hermetic seals used in the present invention are preferably formed of a material which does not outgas when heated. The seals are tight enough to withstand several atmospheres of pressure and prevent water vapor at pressures as high as several atmospheres from leaking out of the hermetically sealed chamber. Means are provided for positioning the crystal within the chamber so that the crystal is in uniform and continuous thermal contact with the walls of the hermetically sealed chamber without mechanical stress to the crystal. First and second heating means for respectively heating the oven walls and the crystal to the operating temperature, and first and second sensor means for respectively sensing the temperatures of the oven walls and the crystal are provided.

Another inventive aspect of the present invention is that it is structured to provide fast thermal response, controlled temperature in the crystal interaction region, and stability against temperature fluctuations caused by heat absorption by the crystal.

It is yet another purpose of the invention to provide a frequency doubling arrangement which rapidly reaches and accurately maintains the desired phase-match condition in the frequency doubling crystal over a longer period of time than has been achieved in the past.

These and other features and advantages of the invention will be apparent to those skilled in the art from the following detailed description of various preferred embodiments, taken together with the accompanying drawings, in which:

DETAILED DESCRIPTION OF THE INVENTION

Figure 1:
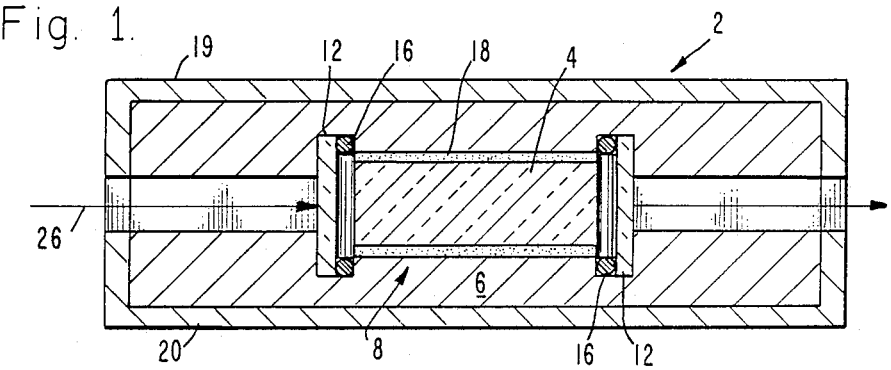
FIG. 1 is a cross-sectional conceptual diagram of the present invention.

FIG. 1 presents a horizontal cross-section view of the apparatus and is a conceptual, simplified illustration. An apparatus 2 for heating a crystal 4 and maintaining the crystal at a desired operating temperature is illustrated in cross-section. Crystal 4 is placed inside a hermetically sealed inner chamber 8 within the apparatus. The chamber 8 is defined by oven walls 6 and input and output windows 12 which are sealed to the walls of the chamber so that the incident laser radiation can enter and exit the chamber through these windows.

An insulation layer 20 surrounds the oven walls 6, and is contained by an outer protective housing 19 as is typically done in the art. Temperature sensor 22 is positioned to sense the temperature of crystal 4, and heaters 24 and 28 are positioned to heat the crystal 4 and oven walls (not shown in FIG. 1). For frequency doubling applications, radiation from a laser source will enter the hermetically sealed chamber 8 through input window 12 as indicated by arrow 26. This radiation will pass through the heated crystal 4 and exit through the exit window 12 with a frequency-doubled component present in the output radiation. Seals 16 are used to seal the input and output windows to the chamber walls.

A flexible thermal layer 18, placed between the crystal 4 and two walls of the chamber 8 ensures continuous thermal contact between the walls and the crystal. These components are discussed in greater detail later.

Crystal dehydration upon heating and consequent weight loss have been reported in literature. In the context of frequency doubling applications, this dehydration has generally been recognized to be the source of one problem, namely, condensation on or fogging of the oven windows. In the present invention, the walls of the chamber and the inner surfaces of the windows 12 are maintained at the same phase-match operating temperature as the crystal to solve the condensation problem. Generally, some dehydration of the crystal will initially occur. However, no condensation will occur on the chamber walls and the inner surfaces of the windows 12 since they are at the same temperature as the crystal 4.

The present invention recognizes the condensation problem, and that crystal dehydration promotes crystal damage. Crystal dehydration manifests itself as cracks which gradually penetrate the crystal. The cracked crystal is more prone to suffer additional surface damage in the cracked area. For example, foreign liquid material, if present in the oven, can be drawn into the cracks via capillary action and can cause surface damage to the crystal. An aspect of the present invention is the confinement of the volatilized water of hydration within the chamber. A moist environment is thereby created within the chamber which reduces crystal damage due to dehydration.

In the present invention, the above is accomplished by hermetically sealing input and output windows 12, to respective ends of the chamber 8 walls with seals 16. It is critically important that the seal meet the following two requirements. First, the seal should not "outgas" when heated. By "outgas" it is meant that the seal should not release absorbed or occluded gases or liquids. Second, the seal should be "hermetic". Typically, by "hermetic seal" it is meant that the seal is airtight. However, for the purposes of the present invention, it is important not only that the seal be airtight, but also that it be strong enough to withstand pressures as high as several atmospheres of pressure. This is to ensure that the water of hydration released by the crystal will not be lost to the surrounding environment, but instead, be confined within the chamber. Seals formed from O-rings, or adhesive, metallic solder or glass-to-metal materials, can be used.

Although ideally the seal should not outgas at all when heated, in practice the seal may outgas slightly but not to such an extent that the chamber environment becomes polluted. In a presently preferred embodiment, O-rings are used as the hermetic seals. Preferably, the O-rings are made from pre-processed, outgassed fluorocarbon material. Thus, the hermetic seals of the present invention perform the functions of keeping pollutants out of the chamber and keeping the water of hydration released by the heated crystal inside the chamber.

The dimensions of the chamber 8 are designed so that the chamber volume is just sufficiently greater than the volume of the crystal so as to reduce the amount of water vapor which must be released from the heated crystal before equilibrium is reached. The reduction in chamber volume enables an equilibrium condition between the crystal and the water vapor pressure to be rapidly reached, and therefore results in a proportionate reduction in the amount of water vapor released by the crystal. Once the equilibrium condition is reached, no further change due to dehydration can occur in the crystal. Loss of water of hydration from the crystal promotes crystal damage, therefore, the reduction in the amount of water vapor required to be released by the heated crystal significantly reduces crystal damage. The equilibrium absolute pressure in the chamber for a CD*A crystal at an operating temperature of approximately 120° C. is approximately two atmospheres.

Preferably, the chamber volume is as close as possible to the volume of the crystal. For example, a crystal-heating oven for heating four crystals was built. This oven operated satisfactorily for more than a year. Each crystal was approximately 0.75" in height, 0.750" in width, and 1.2" in length. The total volume of the four crystals was approximately 2.7 cubic inches. The volume of the chamber within which the crystals were placed was approximately 5.5 cubic inches. The walls of the chamber were approximately 0.375" thick. In this example, the chamber volume was approximately twice the total volume of the four crystals. Although ideally the volume of the chamber should be almost equal to the volume of the crystals, in practice, other factors such as the thickness of the oven walls and positioning of the heaters and sensors may necessitate making the volume of the chamber as much as three or four times greater than the volume of the crystal. This would of course reduce the afore-mentioned advantage flowing from the reduction in chamber volume.

The oven is designed so that the crystal 4 is in continuous thermal contact with the walls of chamber 8. A flexible thermal layer 18, is placed between the crystal and the wall of the chamber to achieve this continuous thermal contact between the walls and the crystal. The flexible thermal layer 18 (a) promotes continuous thermal contact between the walls of the chamber and the crystal, (b) minimizes differential stress within the crystal and (c) promotes uniformity of crystal temperature. Differential stress can result within the crystal due to differences in the thermal expansion coefficients of the crystal and the materials used to fabricate the oven. Since the thermal layer 18 is flexible, the differences in thermal expansion are accommodated without creation of differential stress within the crystal.

If crystal 4 is shaped as a rectangular parallelopiped and the input laser beam has an oval cross-section, it is preferred that only two sides of the crystal be in thermal contact with respective two walls of the chamber to ensure one-dimensional heat flow. If the crystal has a square cross-section, and the input beam has a circular cross-section, it is preferred that all four sides of the crystal 4 be in thermal contact with the four walls of the chamber 8. An important consideration influencing the choice of a suitable material for the thermal layer 18 is that the material be flexible enough to accommodate the differences in thermal expansions of the crystal and the oven walls so that uniform and continuous thermal contact is maintained between the crystal and the oven walls. Materials such as space-qualified silicone rubber can be used. Other materials which can be used for the thermal layer 18 include teflon, indium, gold foil, and grease without volatile elements which can pollute the environment in the chamber. In one preferred embodiment, a thermally conducting, silver-impregnated elastomer, with little or no outgassing, was used as the thermal layer.

As explained earlier, maintaining the inner surfaces of the walls of chamber 8 and the inner surfaces of the windows 12 at the same operating temperature as the heated crystal 4 is an important aspect of the present invention. This may be achieved as illustrated in FIG. 1, by positioning the windows 12 well inside the outer housing 19 of oven 2, so that the windows are somewhat protected from cooling due to exposure to the environment. This makes it easier to maintain the inner surfaces of the windows, which are closest to the crystal, at the same temperature as the desired operating temperature of the heated crystal.

However, in one preferred embodiment of the invention, this objective is more satisfactorily accomplished by the use of very thick windows, thermally in uniform contact with the walls of chamber 8 along the peripheral sides of the windows so as to be at the same temperature as the chamber walls.

Figure 2:
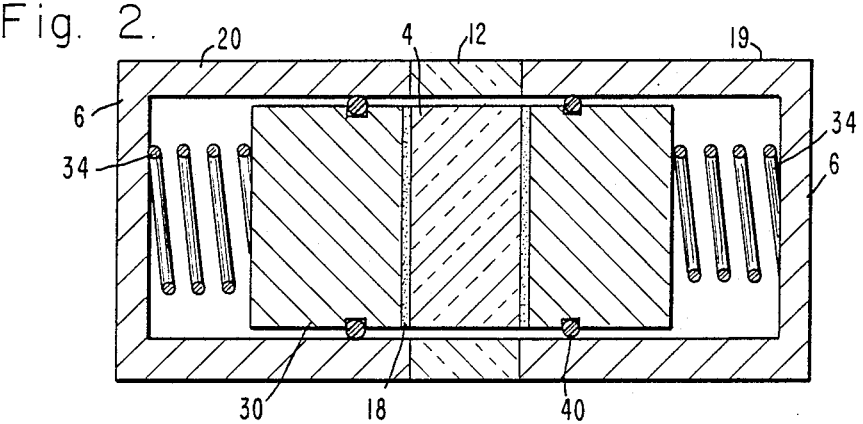
FIG. 2 is a cross-sectional view of a preferred embodiment of the present invention which uses a spring loaded plunger approach to forming the hermetically sealed crystal chamber.

A sectional view of one preferred embodiment of the present invention in horizontal cross-section is illustrated in FIG. 2. This embodiment uses a spring-loaded plunger approach to sealing and forming the hermetically sealed chamber 8. Two hollow plungers 30 are kept pressed, one plunger against each end surface of crystal 4, by compressive springs 34. This embodiment allows the use of several crystals operating at different temperatures. As many crystals as desired can be placed in the chamber and a proportionate number of plunger-spring arrangements can be used. Each spring 34 is operatively connected at one end to the respective plunger 30 and at the other end to the oven wall 6. O-rings 40, hermetically seal each plunger 30 to the oven wall 6. Heaters and temperature sensors (not shown in FIG. 2) are positioned within the hollow plungers 30. The plungers can be made of any suitable thermally conductive material for example any metal, such as copper or aluminum or a thermally conductive non-metallic material such as boron nitride. These materials are specified by way of example only and it is intended that the invention not be limited to these specific materials. Thermal layers 18 are positioned, respectively, between each plunger 30 and adjacent end surface of crystal 4. In this embodiment, the thermal layers 18 need not be flexible, since the plunger-spring arrangement accommodates differences in thermal expansion. These thermal layers serve to ensure good, intimate and uniform thermal contact between the crystal and the surfaces of the plunger which are proximate to the crystal The plunger surface proximate to the crystal surface preferably has the same rectangular or square cross-section as the crystal surface. The plunger stem preferably has a circular cross-section. The crystal 4 is kept in position inside the chamber by the plungers positioned on each side. As earlier stated, materials such as rubber, silver-impregnated silicone, teflon, indium, or grease may be used for the thermal layer. In another alternate embodiment, bellows with air pressure are used instead of the plunger-spring arrangement.

Another aspect of the present invention is the overall thermal design. Conventional oven designs typically maximize thermal mass, minimize heater power and use thick insulation to promote uniformity of temperature. However, this approach makes it difficult to continuously operate the crystal at high average power. In the present invention, the quantity of insulation, heater power, thermal mass of the walls and plungers, position of sensors and other features are carefully adjusted to maximize heating and cooling rates. In other words, the oven is designed for fast thermal sensitivity and adjustment. Preferably, the thickness of the insulation and thermal mass of the walls and plungers are adjusted to be only as much as is required to ensure that the heater power required to maintain the chamber walls at the operating temperature is significantly greater than the amount of laser power absorbed by the crystal. Thus, when the oven body heaters are switched off, the rate at which the oven cools is greater than the laser-induced heating rate of the crystal. Therefore, if the temperature of the crystal rises above the desired phase-match operating temperature, the oven body and crystal heaters are turned down or turned off completely and the crystal cools off rapidly. The cooling would not be as rapid if very thick insulation and high thermal mass were used. In the FIG. 2 embodiment, unlike the FIG. 1 embodiment, the thermal mass of the plungers is more critical than that the overall thermal mass of the metal walls of chamber 8.

Figure 3:
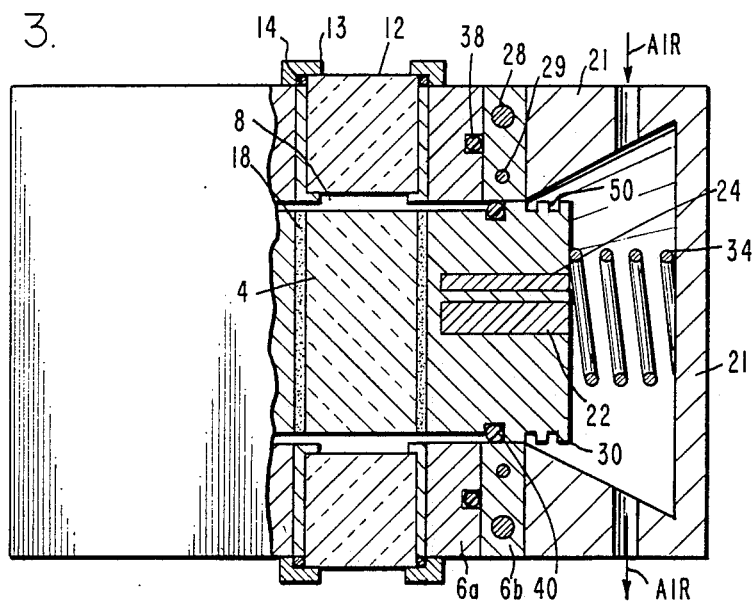
FIG. 3 is a horizontal cross-sectional view of the FIG. 2 embodiment in greater detail.

FIG. 3 shows a portion of the FIG. 2 embodiment in greater detail. Since the device is symmetrical on either side of a vertical plane through the center of crystal 4 in FIG. 2, only the components on the right side of this vertical plane are illustrated in FIG. 3. In addition to the basic components discussed earlier in connection with FIG. 2, possible alternative options are also illustrated in FIG. 3 and are hereinbelow discussed. As shown, the walls 6 may be made in several sections suitably joined together. There is a section 6a for holding the window 12, and a section 6b with holes through which oven body heater 28 and oven body temperature sensor 29 are inserted. Sectional cover piece 21 is preferably formed from a thermoplastic, such as the polyetherimide resin sold under the registered trademark ULTEM ® by General Electric. Such a material acts both as insulation and as a protective outer enclosure. As shown in FIG. 3, an inlet and outlet for air are provided in sectional cover piece 21 which is formed so as to define an area within which air may be circulated.

Fins or suitably configured grooves 50 are provided on the outer surface of the stem of each metal plunger 30, and air is circulated around these fins or grooves to achieve rapid heating or cooling, as desired, for facilitating air-circulated temperature control. When rapid cooling of the hot metal plunger 30 is necessary, the air flow around the grooves 50 is increased. At other times when the plunger 30 is being heated, the air flow is reduced or shut-off completely.

Plunger 30 is kept pressed against the thermal layer 18 and crystal surface 4 by a spring arrangement. As shown in FIG. 3, the compressive spring 34 is connected at one end to the plunger 30 and at the other end to sectional cover piece 21. In a preferred embodiment, the spring is housed inside a screw which is inserted in cover piece 21. By turning the screw, the plunger 30 can very effectively and easily be kept pressed against respective thermal layers 18 and crystal 4. Such screw-spring arrangements are commercially available. For example, the plunger product sold under the brand name Vlier ® may be used.

Crystal temperature sensor 22 and crystal heater 24 are positioned inside plunger 30 as shown in FIG. 3. The connecting lead wires are not shown. Crystal temperature sensor 22 may be held in place by a metal cylinder which is connected at its other end to the spring 34. As many crystal heaters and temperature sensors may be used as required to achieve the uniformity in crystal temperature and different temperatures for different crystals if more than one crystal is being heated, the rapid heating, and accurate temperature sensing. These factors also influence the positioning of these temperature sensors and heaters. Oven body temperature sensors and heaters are also used to heat the oven walls when required. These components are not shown in the figures. However, holes through which these components are inserted are called-out by reference numerals 28 and 29 in FIG. 3. The factors discussed above as influencing the positioning and number of crystal heaters and temperature sensors are also applicable to the oven body heaters and temperature sensors. The crystal heaters and oven body heaters are preferably independently controlled.

O-rings 40 are positioned in grooves along the outer surface of the plunger 30 to seal the plunger hermetically to the oven wall. Similarly O-rings 38 are also used to hermetically seal the oven wall sections holding the windows 12 to the sections with holes 28 and 29. O-rings 14 hermetically seal the windows 12 to the oven wall sections and the window retainers 13 which hold the windows in place.

As discussed earlier, very thick windows 12, thermally in uniform contact with the oven walls 6 along the peripheral sides of the windows are preferred. The thickness enables the inner surfaces of the windows 12 to be at the same operating temperature as the crystal 4, even when the outer surfaces of the windows which are exposed to the room environment are at room temperature.

For example, consider the cross-sectional thermal distribution in a thick window 12, in a horizontal cross-section in the plane of the paper and passing through the center of the window. In this example, crystal 4 is at a temperature of 100° C. and the room temperature is 25° C. The outer surface of window 12 which is exposed to the room environment is at a temperature of 25° C. However, window 12 is thick enough so that the inner surface of the window 12 which is closest to the crystal 4 is at 100° C. Although the inner surface of window 12 is not in direct physical contact with the crystal, it is in contact with the walls of chamber 8 along its peripheral sides, and these walls are maintained at the same operating temperature as the crystal 4. Between the inner and outer surfaces of the windows, the temperature gradually varies. Computer calculations of the heat flow were used to determine the ideal thickness and aspect ratio of the window. The aspect ratio is the ratio of the thickness, t, to the height, h, of the window. Aspect ratios of 1.5:1 or greater were found to be adequate. This example is provided only as an illustration and is not intended as a limitation.

Figure 4:
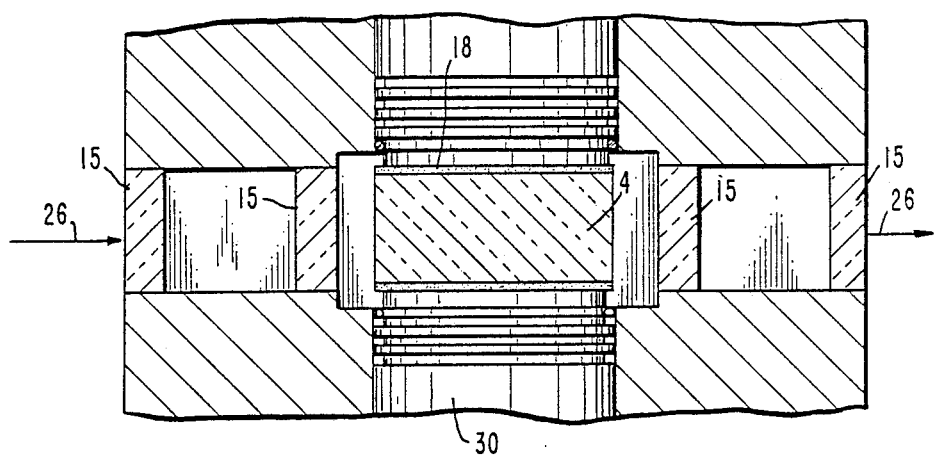
FIG. 4 is a sectional view of an alternate embodiment of a part of the oven illustrated in FIG. 3.

Another embodiment in which the same objective was accomplished without the use of thick windows is shown in FIG. 4. In place of one thick window (12), two windows 15,15 with an evacuated space between them were used.

Figure 5:
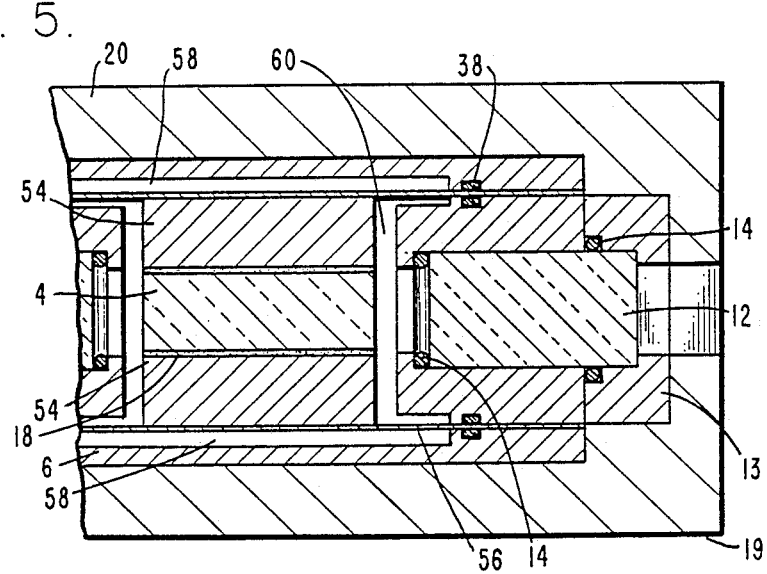
FIG. 5 is a horizontal cross-section view of an alternative embodiment of the present invention which uses a plunger-diaphragm approach.

An alternate embodiment of the present invention is illustrated in FIG. 5. This is similar in many respects to the FIG. 1 embodiment. Crystal 4 is placed between plungers 54 which are rectangular heater blocks. The plungers, like the walls 6, may be formed of any suitable thermally conductive material, metallic or non-metallic. Thermal layer 18 is placed on two sides of the crystal between the adjacent heater blocks 54 and the crystal. Thin diaphragms 56, preferably of a flexible material, are positioned adjacent to the side of each heater block which is away from the crystal. Any suitable flexible material, for example, a metal such as copper may be used for the diaphragm. The diaphragm should be thin enough to be responsive to pressurized air pushing on it, but thick enough to be rigid so as to uniformly exert compressive pressure on the heater block. For example, in one oven which was built, a copper diaphragm of approximately 0.002 inches was used. This is merely an example and should not be construed as a limitation. The diaphragms 56 are attached at the ends to the metal oven walls either with positioning screws or other suitable positioning means (not shown in FIG. 5). O-rings 38 are placed on both sides of each diaphragm to hermetically seal the diaphragm to the oven walls. The oven walls 6 are made of any suitable thermally conductive material, for example, a metal such as aluminum, brass or copper or a non-metallic material such as boron nitride. The space 58 defined by the diaphragm 56, and oven body walls 6 is filled with pressurized air or gas. The pressurized air exerts pressure on the diaphragm 56. The diaphragm 56 presses the heater blocks 54 against the crystal 4 so that the heater blocks 54 are in uniform and continuous thermal contact with the crystal 4.

As discussed earlier in connection with the FIG. 1, the thermal layers 18 facilitate uniform and continuous thermal contact while minimizing stress on the crystal. Air spaces 60 are defined by the crystal input and output ends and plungers on one side and the oven walls and windows 12 on the other side. The crystal 4 is essentially held in place by the heater block-diaphragm-pressurized air arrangement. Therefore, it is very important that the diaphragm 56 exert uniform and continuous pressure on the heater block 54 so as to ensure uniform and continuous thermal contact between the block 54 and crystal 4 with the assistance of the intermediate thermal layer 18. Outer housing 19 is preferably a thermoplastic material for reasons discussed earlier. Components such as windows 12, insulation 19, window retainers 13, and O-rings 38 are generally similar to the components with like reference numerals discussed earlier. The thermal response of this embodiment is not as quick as the embodiment of FIGS. 2 and 3 and the fabrication is comparatively more complex.

Thus, several embodiments of the apparatus of the present invention which can be utilized to heat crystals and maintain them at a controlled operating temperature have been shown and described. Numerous variations and alternate embodiments will be contemplated by those skilled in the art. It is intended, therefore, that the invention not be limited solely to the described embodiments. Various modifications are contemplated and can be made without departing from the spirit and scope of the invention, as hereinafter defined by the appended claims.

What is claimed is:

1. An apparatus for maintaining a crystal at a controlled operating temperature, comprising:
    (a) thermally conductive walls defining an inner chamber for the crystal;
    (b) input and output windows positioned at each end of said chamber for enclosing said chamber, each one of said windows having inner and outer surfaces, the inner surfaces of said windows being maintained at the operating temperature;
    (c) hermetic seals for sealing said windows to said chamber, said hermetic seals being formed of a material that does not outgas when heated, said hermetic seals being tight enough to prevent water vapor at pressures as high as several atmospheres from leaking out of said chamber;
    (d) means for positioning the crystal within said chamber in uniform and continuous thermal contact with said chamber, said means including at least one flexible thermal contact layer wherein said flexible thermal contact layer comprises a material flexible enough to accommodate differential thermal expansion of said crystal and said metal walls without breaking the thermal contact therebetween;

(e) first and second heating means for respectively heating said walls and the crystal to the operating temperature;

(f) first and second sensor means for respectively sensing the temperatures of said walls and the crystal.

2. The apparatus of claim 1 wherein said hermetic seals comprise O-rings.

3. The apparatus of claim 1 wherein the volume of said chamber is sufficiently greater than the volume of the crystal so as to reduce the amount of water which must be released from the heated crystal before equilibrium is reached.

4. The apparatus of claim 3, wherein said material comprises an elastomer.

5. The apparatus of claim 3 wherein said material comprises space-qualified silicone rubber.

6. The apparatus of claim 5, wherein said space-qualified silicone rubber is impregnated with silver.

7. The apparatus of claim 1, further including a third window positioned adjacent said input window with an evacuated space therebetween and a fourth window positioned adjacent said output window with an evacuated space therebetween, to protect said input and output windows from the environment.

8. The apparatus of claim 1 wherein each of said windows is thick enough so that its respective inner surface is at the same temperature as said crystal even when the outer surface is at room temperature.

9. The apparatus of claim 1 wherein said means for positioning said crystal within said chamber further comprises:

first and second metal plungers each having (a) a first surface, respectively, positioned adjacent to a surface of said crystal, with said thermal contact layer therebetween, and (b) a stem, and formed of a thermally conductive material, and compressive spring means, operatively connected at each first end to the walls and at the other end to said stems of said first and second metal plungers, for compressively pressing said first and second metal plungers against the surfaces of said crystal.

10. The apparatus of claim 9, wherein each one of said plungers is hollow, and said second heating means for heating said crystal and said second sensor means for sensing the temperature of the crystal are respectively positioned inside each one of said plungers.

11. The apparatus of claim 10 wherein the outer surfaces of each stem is suitably grooved for facilitating air-circulated temperature control.

12. The apparatus of claim 1 wherein said means for positioning said crystal within said chamber further comprises:

first and second hollow plungers, formed of a thermally conductive material, each having a first surface positioned adjacent to a surface of said crystal, with said thermal contact layer therebetween, said heating means for heating said crystal and said sensor means for sensing the temperature of said crystal being positioned inside each one of said plungers;

first and second diaphragms, operatively acting respectively upon said first and second plungers, the thickness of said diaphragms being sufficient to uniformly exert compressive pressure on said first and second plungers in response to actuation; and pressurized air, between the diaphragms and adjacent walls for actuating said diaphragms.

13. An apparatus for use in a frequency doubling arrangement with incident laser radiation, comprising:

metal walls defining a chamber;

a crystal of electro-optic material, having an input end and an output end and a first surface and a second surface, positioned inside said chamber to receive an input beam of radiation at a first frequency, said crystal being oriented to convert said input beam into an output beam having a component at twice said predetermined frequency;

input and output windows hermetically sealed to said walls, said windows having inner surfaces respectively positioned adjacent to said input and output ends of said crystal;

first and second hollow metal plungers, for positioning said crystal, each said plunger having a first surface and a stem, said plungers positioned inside said chamber with first surfaces of each plunger positioned respectively adjacent to first and second surfaces of said crystal;

first and second thermal contact layers respectively positioned between the first surfaces of said first and second hollow metal plungers and first and second surface of said crystal, for ensuring uniform and continuous thermal contact therebetween;

heater means positioned within each of said first and second hollow metal plungers for heating said crystal;

sensor means positioned within each of said first and second hollow metal plungers, for sensing the temperature of said crystal;

at least two O-rings each respectively surrounding the stem of each one of said first and second hollow metal plungers so as to hermetically seal said metal walls to said metal plungers;

first and second cover-pieces;

first spring means operatively connected between the stem of said first hollow metal plunger and said first cover-piece for compressively maintaining uniform thermal contact between said first hollow metal plunger and said crystal; and second spring means operatively connected between the stem of said second hollow metal plunger and said second cover-piece for compressively maintaining uniform thermal contact between said second hollow metal plunger and said crystal.

14. The apparatus of claim 13 wherein the respective outer surfaces of the stems of said first and second hollow metal plungers are suitably grooved to promote air-circulated temperature control.

15. The apparatus of claim 14 wherein the inner surfaces of said input and output windows are at the same temperature as said crystal.

16. The apparatus of claim 15 wherein said first and second cover pieces comprise thermoplastic material.

17. The apparatus of claim 16 further including at least a second crystal inside said chamber, and additional respective associated pair of hollow metal plungers, pair of spring means, thermal contact layers, heater means, and sensor means.

18. The apparatus of claim 13 wherein said metal walls are surrounded by insulation which is not more thick than is required so that the heater power required to maintain said walls at the operating temperature is greater than the power of the incident laser radiation which is absorbed by said crystal.

19. A method of maintaining a frequency-doubling crystal at a desired operating temperature in a chamber inside a crystal oven, comprising the steps of:
  positioning first and second hollow plungers, formed of a thermally conductive material, inside said chamber,
  placing first and second thermal contact layers adjacent respective first surfaces of said plungers;
  placing said crystal between said plungers;
  turning spring means operatively connected to said plungers to compressively press said plungers and said thermal contact layers against said crystal;
  hermetically sealing input and output windows to said oven;
  hermetically sealing said plungers to said oven;
  heating said crystal and said oven to the desired operating temperature;
  circulating air and controlling air flow through the chamber to facilitate temperature control;
  maintaining the inner surfaces of said input and output windows at the desired operating temperature.

* * * * *